Sept. 28, 1926.
J. W. PLAMONDON
1,601,601
DIRIGIBLE HEADLIGHT FOR AUTOMOBILES
Filed Feb. 28, 1925   2 Sheets-Sheet 1
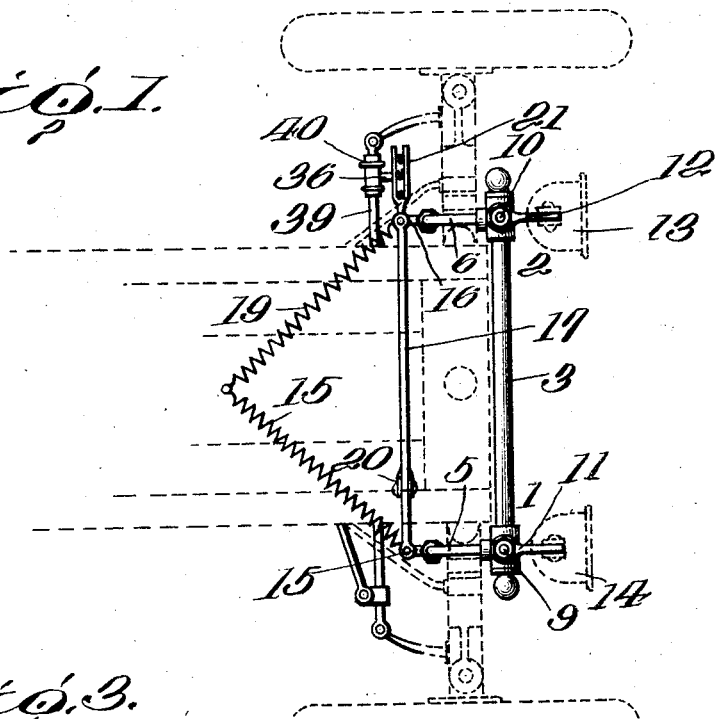
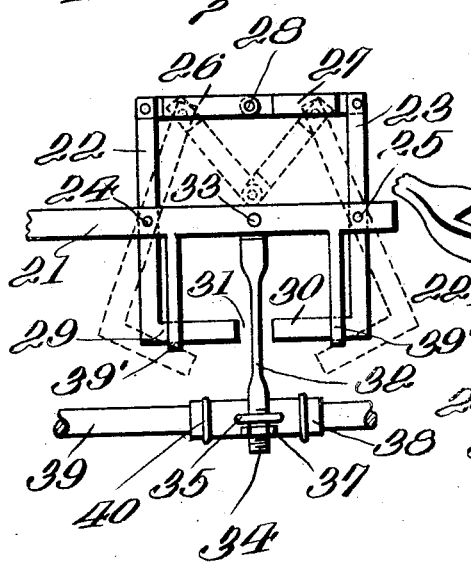
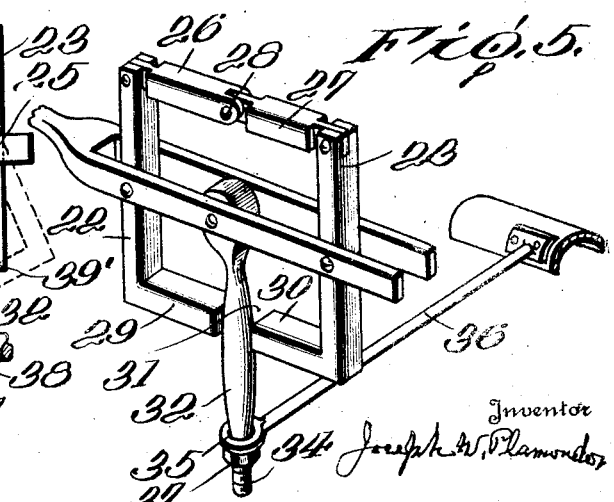

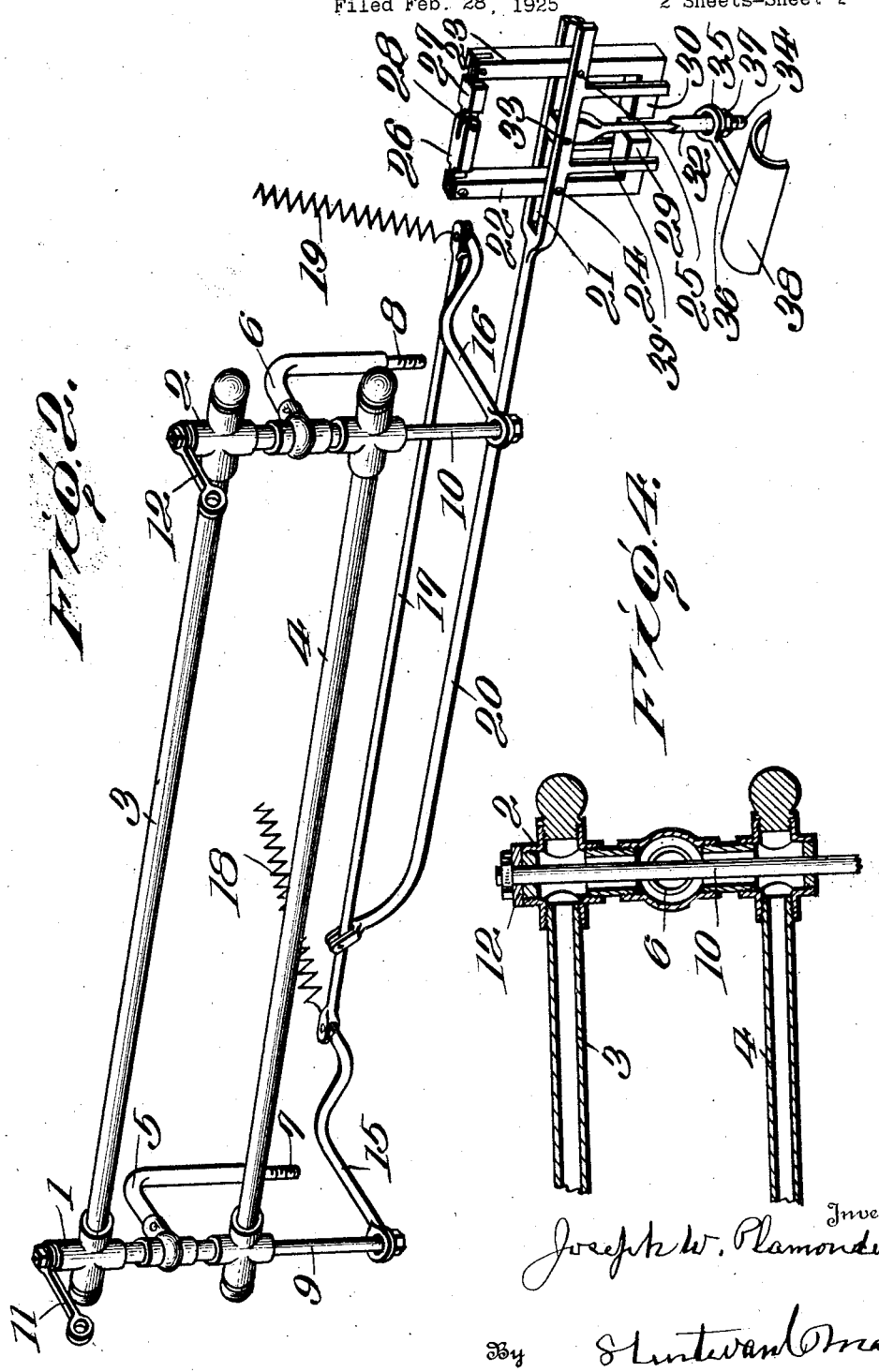

Patented Sept. 28, 1926.

1,601,601

UNITED STATES PATENT OFFICE.

JOSEPH WILFRID PLAMONDON, OF STE. MADELEINE, QUEBEC, CANADA, ASSIGNOR OF ONE-HALF TO JOSEPH NAPOLEON, ALIAS PAUL FOURNIER, OF ST. HYACINTHE, QUEBEC, CANADA.

DIRIGIBLE HEADLIGHT FOR AUTOMOBILES.

Application filed February 28, 1925. Serial No. 12,459.

My invention relates to improvements in dirigible head lights for automobiles.

The object of my invention is to provide a dirigible head light for automobiles which is controlled through the connecting rod steering gear of an automobile, and which will be normally maintained to throw the light straight ahead, and the slight vibration of the steering gear, or a slight turning of the car will not be imparted to the head lights, and therefore the lights, under normal running, are held perfectly steady under spring tension pointing straight ahead.

Another object of my invention is to provide a head light of this character which can be readily placed in brackets attached to an automobile, or placed in the ordinary bracket, employed for supporting the rigid head lights, and which can be connected up to the steering gear of different machines without drilling or otherwise changing the general arrangement of the steering gear.

A further object of my invention is to provide a simple, cheap and effective dirigible head light having certain details of structure and combination of parts hereinafter more fully set forth.

In the accompanying drawings:—

Figure 1 is a top plan view of the forward end of an automobile in dotted lines, showing my improved attachment applied thereto.

Figure 2 is a perspective view of the complete attachment with the head lights removed.

Figure 3 is a side elevation of the regulator for preventing the shocks of the steering rod from being imparted to the head lights and showing in dotted lines, the parts in position, whereby the head lights will not be affected by the steering mechanism.

Figure 4 is a vertical transverse sectional view showing the oscillating rod carrying the lamp supporting bracket.

Figure 5 is a perspective view of the regulator showing a modified form of operating arm, whereby the device is capable of attachment to automobiles of different makes.

Referring now to the drawings, 1 and 2 represent the two vertical tubular standards rigidly connected together by the horizontal rods 3 and 4. The vertical standards 1 and 2, intermediate the rods 3 and 4, are provided with rigid outwardly extending arms 5 and 6, having their ends turned downwardly, as clearly shown in Figure 2 of the drawings and their extreme lower ends provided with the threaded portions 7 and 8. These arms 5 and 6 are adapted to enter the ordinary lamp sockets of an automobile or may be connected to the automobile at any desired point and in any desired manner, as the specific attaching means is not a part of this invention. Extending through the vertical tubular standards 1 and 2 are the head light bracket supporting rods 9 and 10, freely mounted within the standards and carrying at their upper ends the outwardly extending arms 11 and 12, to which the head lights 13 and 14 may be attached in any desired manner, preferably that shown in Figure 1 of the drawings.

The lower ends of the rods 9 and 10 have rigidly connected thereto the inwardly extending arms 15 and 16, connected together at their outer ends by the rod 17, whereby the two head light bracket supporting rods 9 and 10 are oscillated together so that the head lights carried thereby will move together the same distance upon the movements of the rod, as will be later described. The rod 17 has connected at its outer end the two coil springs 18 and 19 which extend inwardly under the car and may be attached at any desired point to the running gear, so as to exert about 25 lbs. pressure upon the rod 17, so that the head lights 13 and 14 are normally held in the position shown in Figure 1 of the drawings, throwing the light in the stright line directly ahead of the machine. Connected to the rod 17 is a downwardly curved rod 20, which extends downwardly and out towards the side of the car beyond the engine, and has its outer end bifurcated as indicated at 21. Pivotally mounted between the bifurcated end 21 of the rod 20 are two levers 22 and 23, pivoted at 24 and 25, intermediate their ends. The upper ends of the levers 22 and 23 have pivotally connected thereto the links 26 and 27, pivotally connected together at their inner ends as indicated at 28. The lower ends of the levers 22 and 23 are turned inwardly as indicated at 29 and 30 leaving a considerable space 31 between the adjacent faces thereof. Pivotally mounted in the bifurcated end 21 of the rod 20, is the head light operating rod 32, pivoted at its upper end as indicated at 33, at a point mid-way between the pivots 24 and 25 of the levers 22 and 23. The lower end of the rod 32 is screw threaded as indicated at 34, and passes through an eye 35 carried by the arm 36, and held against displacement by means of the nut 37. The arm 36 has an enlarged circular plate 38, by means of which it can be attached to the steering rod 39 of the automobile, by means of clips 40, as clearly shown in Figure 1 of the drawings. The bifurcated end 21 is provided on each side with downwardly extending guide plates 39' which engage the outer faces of the inwardly turned ends of the levers 22 and 23.

In Figure 5 of the drawings, like reference numerals indicate like parts, and I have shown the arm 36 of a length considerably greater than that shown in Figure 2 of the drawings and whereby the device is capable of attachment to automobiles of different makes. By having different length arms 36 it will be seen that upon assembling the device on the automobile any length arm can be used according to the distance the regulator is from the steering bar.

From the foregoing description it will be seen that under normal running of the car a slight movement of the steering connecting rod 39 will allow the rod 32 to move in either direction without engaging the faces of the inwardly turned ends 29 and 30 of the levers, and thus any slight movement or vibration of the steering connecting rod 39 simply swings the rod 32 upon its pivot 33 and the tension of the springs 18 and 19 maintain the head lights in their normal position, throwing the lights in a line straight ahead. Any material movement of the steering connecting rod 39 will cause the rod 32 to engage one or the other of the inwardly turned ends 29 and 30, and move the rod 20 in one or the other direction, which in turn moves the rod 17, carrying the two oscillating rods 9 and 10 causing the same to oscillate in the standards 1 and 2, and move the arms, causing the head lights to turn in the direction the car is turning and thus the light therefrom is directed on the road. In the day time, when it is not desired that the head light move with the steering mechanism, the links 26 and 27 are forced downwardly as shown in dotted lines in Figure 3, which moves the inwardly turned ends 29 and 30 outwardly away from the rods 32 so that the movement of the steering connecting rod and the rod 32 will not engage the same, and thus the head lights 13 and 14 are held in a position, pointing directly ahead, by means of the openings 18 and 19.

Having thus fully described my invention what I claim is:—

1. A dirigible headlight comprising a frame, oscillating shafts mounted in the frame and carrying headlights at their upper ends, arms carried by the lower ends of said shafts, a connecting rod for joining said arms, an operating rod connected to said connecting rod and extending out adjacent the steering gear connecting rod of the car, devices rigidly connected to the steering gear rod and pivotally connected to the operating rod and including means whereby said steering gear rod may have a limited movement without moving the operating rod.

2. A dirigible headlight comprising a frame, two vertical shafts mounted therein and having headlight supporting brackets at their upper ends, means for attaching said frame to an automobile, arms rigidly carried by the lower ends of said shafts, a connecting rod connecting said arms, an operating rod pivotally connected to said connecting rod and having at its outer end a regulator connected to the steering rod of the automobile, whereby movements of the steering rod will impart movements to the headlights, said regulator including devices whereby any slight vibration and movement of the steering rod will not be imparted to the headlights.

3. A dirigible head light comprising a frame, brackets for attaching said frame to the automobile, two vertically disposed shafts oscillating in said frame, head light supporting brackets carried by the upper ends of the oscillating shafts, arms rigidly carried by the lower ends of the shafts, a rod pivotally connecting the arms, springs connected to the rod and to the body of the car, an operating rod connected to the connecting rod and having its outer ends bifurcated, a rod pivotally connected between the bifurcated ends of the operating rod and connected to the steering connecting rod, and inwardly extending arms carried by the bifurcated end of the operating rod, and spaced from the pivotally mounted rod, whereby the pivotally mounted rod has a limited movement without moving the operating rod.

4. A dirigible head light comprising a frame, having two head lights pivotally mounted thereon, a rod for simultaneously moving said head lights, and having a bifurcated outer end, a rod pivoted at its upper end between said bifurcated ends and rigidly connected to the arms carried by the steering connecting rod, and inwardly extending members carried by the bifurcated end of the operating rod and spaced therefrom, whereby the steering rod has a limited movement without moving the operating rod.

5. A dirigible head light comprising a frame adapted to support two head lights connected together to move in unison and normally spring held in a straight forward direction, a rod for operating said head lights and having a bifurcated end, a rod pivoted at its upper end between the bifurcated end of the operating rod and having its lower end connected to an arm carried by the steering connecting rod, two pivotally mounted levers carried by the bifurcated end of the operating rod and having their ends turned inwardly and spaced from the vertically pivoted rod, and their upper ends connected by toggle links, whereby the lower inwardly turned ends of the lever may be moved away from the vertically disposed operating rod so that the movement of the steering connecting rod will not be imparted to the head lights.

6. A dirigible head light for automobiles, comprising a frame, two head lights mounted therein to operate in unison and normally spring held in a straight forward direction, a rod for operating the said head lights and having a bifurcated outer end, a rod pivoted at its upper end between the bifurcated end of the operating rod and having its lower end connected to an arm carried by the steering connecting rod of the automobile, a lever intermediately pivoted on each side of the pivoted rod within the bifurcated end of the operating rod and having their lower ends turned inwardly and spaced from the pivoted rod, and toggle links connecting the upper ends of the levers, whereby the upper ends of the levers may be drawn inwardly moving the lower inwardly turned ends of the levers away from the pivoted rod, whereby the pivoted rod is free to swing upon its pivot without imparting motion to the operating rod.

7. A dirigible headlight comprising a frame composed of two standards connected by rods, vertical shafts mounted in said standards, a headlight bracket carried by the upper end of each shaft, brackets carried by the standards for attaching said standard to the automobile, an arm rigidly connected to the lower end of each vertical shaft, a connecting rod joining the outer ends of said arms, springs connected to the ends of said connecting rod and the body of the car, and normally holding the oscillating shafts in a position with the headlights pointing directly ahead, an operating rod pivotally connected to said connecting rod and having its outer end bifurcated, a rod pivotally connected to the bifurcated end of the operating rod and extending downwardly, a bracket carried by the steering connecting rod and having an arm connected to the lower end of the downwardly extending pivoted rod, a pivoted lever mounted in the bifurcated end of the operating rod on each side of the pivoted rod and having their lower ends turned inwardly and spaced from the pivoted rod, and toggle links connecting the upper ends of the levers whereby the lower ends may be moved outwardly away from the pivoted rod.

8. A dirigible head light comprising a frame, means for attaching the frame to an automobile, two vertically disposed supporting shafts oscillating in said frame, arms rigidly carried by the lower ends of the shaft, a rod pivotally connecting said arms, an operating rod connected to the connecting rod, a rod pivotally connected to the outer end of the operating rod, and having a limited movement without imparting movement to the operating rod.

9. A dirigible head light comprising a frame having two head lights pivotally mounted thereon, a rod for simultaneously moving said head lights, a rod pivotally connected at its upper end to the first mentioned rod, and means carried by the first mentioned rod for allowing a limited movement of the second mentioned rod without imparting movement to the first mentioned rod.

10. A dirigible head light comprising a frame having two head lights pivotally mounted thereon, a rod for simultaneously moving said head lights, and having a bifurcated outer end, a rod pivoted within the bifurcated end of the rod and connected to the arm carried by the steering connecting rod, and means carried by the rod and spaced from the pivoted rod, whereby the steering rod has a limited movement without moving the operating rod.

In testimony whereof, I affix my signature.

JOSEPH WILFRID PLAMONDON.